United States Patent
Tumback

(10) Patent No.: US 9,234,489 B2
(45) Date of Patent: Jan. 12, 2016

(54) METHOD FOR OPERATING A TEMPERATURE-LIMITING DEVICE, TEMPERATURE-LIMITING DEVICE AND ELECTRICAL APPARATUS

(75) Inventor: Stefan Tumback, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 565 days.

(21) Appl. No.: 13/807,481

(22) PCT Filed: Jun. 20, 2011

(86) PCT No.: PCT/EP2011/060214
§ 371 (c)(1),
(2), (4) Date: Mar. 13, 2013

(87) PCT Pub. No.: WO2012/000819
PCT Pub. Date: Jan. 5, 2012

(65) Prior Publication Data
US 2013/0162024 A1 Jun. 27, 2013

(30) Foreign Application Priority Data
Jul. 1, 2010 (DE) .......... 10 2010 030 830

(51) Int. Cl.
*H01H 35/00* (2006.01)
*F02N 11/10* (2006.01)
*F02N 11/08* (2006.01)

(52) U.S. Cl.
CPC .......... *F02N 11/101* (2013.01); *F02N 11/0825* (2013.01); *F02N 11/10* (2013.01); *H01H 35/00* (2013.01); *F02N 2200/045* (2013.01); *Y02T 10/48* (2013.01); *Y10T 307/773* (2015.04)

(58) Field of Classification Search
CPC ............................. F02N 11/087; F02N 11/10
USPC ......................................................... 307/10.6
See application file for complete search history.

(56) References Cited

U.S. PATENT DOCUMENTS

| | | | |
|---|---|---|---|
| 4,901,690 A * | 2/1990 | Cummins | F02N 11/10 123/179.1 |
| 6,437,460 B1 * | 8/2002 | Theofanopoulos | B60L 11/1809 307/10.1 |
| 6,868,318 B1 * | 3/2005 | Cawthorne | B60L 11/005 307/10.1 |
| 2008/0172170 A1 | 7/2008 | Lecole et al. | |

FOREIGN PATENT DOCUMENTS

| | | |
|---|---|---|
| DE | 199 46 808 | 4/2001 |
| DE | 199 25 872 | 5/2001 |
| DE | 100 53 750 | 6/2002 |
| EP | 0 581 474 | 2/1994 |
| EP | 1 580 424 | 9/2005 |
| EP | 2 239 454 | 10/2010 |
| WO | WO 2006/125872 | 11/2006 |

* cited by examiner

*Primary Examiner* — Dharti Patel
(74) *Attorney, Agent, or Firm* — Kenyon & Kenyon LLP

(57) ABSTRACT

In a method for operating a temperature-limiting device of an electrical unit activatable for a limited time period by way of an activation signal, the temperature-limiting device permits activation of the electrical unit upon occurrence of the activation signal only if a counter value is greater than or less than a reference value, the counter value being incremented or decremented by a determined temperature equivalence value upon each activation of the electrical unit.

10 Claims, 1 Drawing Sheet

METHOD FOR OPERATING A TEMPERATURE-LIMITING DEVICE, TEMPERATURE-LIMITING DEVICE AND ELECTRICAL APPARATUS

BACKGROUND OF THE INVENTION

1. Field of the Invention

The present invention relates to a method for operating a temperature-limiting device of an electrical unit activatable for a limited time period by way of an activation signal. The invention further relates to a temperature-limiting device, and to an electrical unit.

2. Description of the Art

Methods of the kind recited above are known from the existing art. The temperature-limiting device is usually associated with the electrical unit. The temperature-limiting device serves to permit activation of the electrical unit upon occurrence of the activation signal only when the temperature of the electrical unit, or an estimated temperature of the electrical unit, is below a specific temperature, in particular a limit operating temperature of the electrical unit. This means that the temperature-limiting device serves to limit the temperature of the electrical unit in such a way that neither temperature-related damage to the electrical unit nor a reduction in its service life can occur. The electrical unit is, for example, operated in such a way that it is at first deactivated, upon occurrence of the activation signal is activated only briefly, i.e. over the limited time period, and is then deactivated again. The electrical unit can be, in particular, a starter device of a motor vehicle, i.e. serves to start an internal combustion engine of the motor vehicle. Upon occurrence of the activation signal, the electrical unit or starter device is therefore operated so as to bring the internal combustion engine to a predetermined rotation speed and thus start it. The electrical unit is then deactivated again and, for example, operated as a generator. While the electrical unit is activated, it generates heat, which raises its temperature. If the electrical unit is activated over too long a time period, or is activated too often within a specific time span, the temperature of the electrical unit can then become greater than the limit operating temperature. As already stated above, this can result in damage to the electrical unit.

Published German patent application document DE 199 46 808 A1, for example, discloses an electrical starter apparatus for an internal combustion engine. The electrical starter apparatus possesses a thermal monitoring protection system for taking the starter apparatus out of service when its limit operating temperature is reached. The starter apparatus has a device for identifying a virtual operating temperature, in which context the device identifies the virtual operating temperature as a function of at least one operating parameter influencing the operating temperature of the starter apparatus. The virtual operating temperature is identified, for example, as a function of a current ratio that relates an actual starter current to a reference current. The reference current is, in particular, a rated current of the starter apparatus. The virtual operating temperature is then calculated, from the current ratio by integration. In order to determine the virtual operating temperature as accurately as possible, the integration must occur with a short time interval. Starter apparatuses of this kind are therefore constantly carrying out relatively complex calculations in order to determine the virtual operating temperature of the starter apparatus, and to take it out of service when its limit operating temperature is reached. The calculation unit needed to execute these calculations is, however, expensive.

BRIEF SUMMARY OF THE INVENTION

The method for operating a temperature-limiting device according to the present invention has, in contrast, the advantage that it can be implemented very simply and economically. This is achieved, according to the present invention, by the fact that the temperature-limiting device permits activation of the electrical unit upon occurrence of the activation signal only if a counter value is less than or greater than a reference value, the counter value being incremented or decremented by a determined temperature equivalence value upon each activation of the electrical unit. It is therefore not necessary to carry out any complex calculations or laborious measurements. Provision is made merely for incrementing or decrementing the counter value by the temperature equivalence value, and comparing the counter value with the reference value. For example, at the beginning of an operation of the electrical unit or of the temperature-limiting device, the counter value is reset to an initial value. This initial value is usually different from the reference value. The counter value thus represents an indication of the temperature of the electrical unit. The design of this counter value is flexible. A large counter value can correspond to a high temperature and a small counter value to a low temperature, or a small counter value can correspond to a high temperature and a large counter value to a low temperature. This is achieved by the embodiments of the incrementing and decrementing by the temperature equivalence value. The condition that activation of the electrical unit is permitted only when the counter value is less than or greater than the reference value must accordingly be selected consistently: if a large counter value corresponds to a high temperature, then the aforesaid condition is to be stated as "less than"; if a small counter value corresponds to a low temperature, then the aforesaid condition must be stated as "greater than." Provision can be made here to set the initial value as a function of at least one determined magnitude. A measurement or a calculation, for example, is carried out in order to determine the magnitude. The determined magnitude can be, for example, the ambient temperature, the intake air temperature of the air aspirated by the internal combustion engine, the oil temperature of oil in the internal combustion engine, or the accessory temperature of at least one accessory in the region of the internal combustion engine, in particular in the engine compartment.

If the activation signal occurs during operation of the electrical unit or of the temperature-limiting device, the counter value is then compared with the reference value. Only if the counter value is less than or greater than the reference value is the electrical unit activated, or is activation permitted. The counter value is then incremented or decremented by the determined temperature equivalence value. Alternatively, provision can of course also be made to increment or decrement the counter value upon occurrence of the activation signal but before activation of the electrical unit. In this case the counter value is compared with the reference value only after the incrementing or decrementing. This limits the frequency with which the electrical unit is activated within a specific time span, so that an increase in the temperature of the electrical unit to a temperature greater than its limit operating temperature is avoided. The incrementing or decrementing by the determined temperature equivalence value usually occurs only when the activation signal occurs or only upon activation of the electrical unit, and even then only once, in particular not permanently. Particularly preferably, the temperature equivalence value is a predetermined value that is stored in particular in the temperature-limiting device. Provision can be made that the temperature equivalence value is determined as a function of the determined magnitude, i.e. for example the ambient temperature, intake air temperature, oil temperature, or accessory temperature. Alternatively, the determined magnitude can also be the vehicle speed of the motor vehicle. Provision can likewise be made that a combination of the aforesaid magnitudes is used, i.e. the temperature equivalence value is determined from at least two of the magnitudes.

Use of the counter thus effectively avoids, in very simple fashion, damage to the electrical unit as a result of overheating. If the electrical unit is the starter device of the motor vehicle, then, for example, upon activation of the ignition the counter value is set to the initial value. When a driver of the motor vehicle issues the instruction to actuate the starter device, the activation signal is transmitted to the electrical unit. If the internal combustion engine does not start upon subsequent activation of the electrical unit, the driver can bring about an activation of the electrical unit only as long as the counter value is greater than or less than the reference value. In order to be able to activate the starter device again, the driver must then deactivate the ignition and reactivate it in order to reset the counter value to the initial value. He or she therefore cannot activate the electrical unit arbitrarily often without interruption, with the result that overheating is prevented. The temperature-limiting device or the electrical unit can additionally possess a device that permits activation of the electrical unit only for the limited time period. Continuous operation of the electrical unit, which might result in overheating even at a low activation frequency, is thus not possible. The device ensures, for example, deactivation of the electrical unit after the specific time period has elapsed.

A refinement of the invention provides that, in particular while the electrical unit is not activated, the counter value is decremented at a determined decrementing rate or incremented at a specific incrementing rate. "Decrementing" corresponds here to the embodiment in which a large counter value corresponds to a high temperature of the electrical unit; "incrementing" corresponds to the embodiment in which a small counter value corresponds to a high temperature of the electrical unit. Expressed in general terms, therefore, the counter value is modified (i.e. respectively decremented or incremented) at a specific rate of change (namely, a decrementing rate or an incrementing rate) while the electrical unit is not activated. The decrementing or incrementing simulates a cooling of the electrical unit. The decrementing rate or incrementing rate describes a reduction or increase, respectively, in the counter value over a specific time span. The decrementing rate or incrementing rate thus has, for example, the unit [1/s]. Alternatively, however, a time unit (for example, [s]) can also be provided. In this case the decrementing rate or incrementing rate indicates the time after the expiration of which the counter value is decremented or incremented, respectively, by a predetermined value, in particular 1. Decrementing is advantageously provided when the counter value is incremented by the temperature equivalent value upon each activation of the electrical unit. If, conversely, the counter value is to be decremented, the counter value must then be incremented at the specific incrementing rate. Advantageously, decrementing or incrementing occurs only while the electrical unit is not activated. When the electrical unit is activated, it generates heat, which raises the temperature of the electrical unit. What occurs is therefore not cooling, but instead heating. Because cooling of the electrical unit is to be simulated with the decrementing rate or incrementing rate, it is consequently useful to carry out decrementing or incrementing only while the electrical unit is not activated. In a preferred embodiment of the invention, the decrementing rate or the incrementing rate can be determined as a function of the determined magnitude, i.e. for example the ambient temperature, intake air temperature, oil temperature, accessory temperature, or vehicle speed.

A refinement of the invention provides that the reference value is stipulated as a function of the counter value. Provision can thus be made to modify the reference value as soon as the counter value assumes specific values. It is thereby possible, for example, to achieve a hysteresis or hysteresis-like behavior in the temperature-limiting device. For example, the reference value can be selected to be greater, starting from the normally used reference value, if the electrical unit is activated comparatively seldom. The reference value is conversely decreased, starting from the normally used reference value, if activation of the electrical unit occurs often.

A refinement of the invention provides that the reference value is set to a first reference value when the counter value falls below a minimum value. This is provided in particular when the counter value is incremented by the temperature equivalence value upon each activation of the electrical unit, and is decremented at the decrementing rate. As long as the counter value is below the minimum value, or falls below it, the reference value should therefore correspond to the first reference value. The first reference value is, for example, a predefined value.

A refinement of the invention provides that the reference value is set to a second reference value when the counter value exceeds a maximum value, the second reference value being, in particular, less than the first reference value. Thus, as long as the counter value is greater than the maximum value or exceeds it, the reference value corresponds to the second reference value. It is advantageous in this context if the second reference value is less than the first reference value. The result is to achieve hysteresis-like behavior by the temperature-limiting device. The second reference value is preferably selected in such a way that when the counter value exceeds the maximum value, activation of the electrical unit is no longer permitted by the temperature-limiting device. Only when the counter value has dropped to the minimum value, or has fallen below it, is the reference value once again to be selected in such a way that activation of the electrical unit is possible as soon as the activation signal occurs. For example, in this context the minimum value corresponds to the second reference value, and the maximum value corresponds to the first reference value. This describes the exemplifying embodiment in which a large counter value corresponds to high temperatures. If, conversely, the counter value is selected in such a way that a large counter value corresponds to low temperatures, then of course in order to embody the hysteresis-like behavior the sign must of course be inverted in all the comparisons, i.e. the minimum value and maximum value must be exchanged, as well as the "greater" and "less than" comparisons. In addition, the second reference value must then of course be selected to be greater than the first reference value. The minimum value can, however, also be selected independently of the second reference value, and the maximum value independently of the first reference value.

A refinement of the invention provides that the temperature equivalence value of an, in particular average, temperature elevation of the electrical unit generated by activation of the electrical unit, and/or the decrementing rate, correspond substantially to a cooling rate of the electrical unit. The temperature-limiting device can thus be provided to permit only a specific number of activations of the electrical unit per unit time. It is particularly advantageous, however, if the actual temperature of the electrical unit is at least approximately represented by the counter value. For this purpose, the temperature equivalence value corresponds to the temperature elevation that is to be expected upon activation of the electrical unit. For example, the average temperature elevation occurring in different environmental conditions is stored in the temperature-limiting device. Additionally or alternatively, the decrementing rate can of course also substantially correspond to the cooling rate of the electrical unit, in which context the average decrementing rate occurring in different environmental conditions is advantageously likewise stored.

The counter value, the temperature equivalence value, and the decrementing rate are usually not the actual temperature of the electrical unit, but rather merely a normalized or dimensionless temperature which is referred, for example, to a reference temperature. The reference temperature can be a predetermined or stipulated value, or can be determined as a function of at least one, in particular measured, environmental state variable. This makes possible, alongside protection of the electrical unit from the occurrence of an excessive temperature, an at least approximate statement as to the present temperature of the electrical unit.

A refinement of the invention provides that the temperature equivalence value, the decrementing rate, the incrementing rate, and/or the reference value are determined as a function of at least one, in particular measured, environmental state variable and/or one vehicle state. In a simple embodiment of the method for operating the temperature-limiting device, predetermined values or predetermined rates are provided for the aforementioned values or rates, respectively. In a particularly advantageous embodiment, however, provision is made to coordinate the values or rates with the at least one environmental state variable. The environmental state variable in this context is, for example, the temperature, which is preferably measured by way of a measurement device. At a high ambient temperature, for example, the temperature equivalence value can be selected to be greater and/or the decrementing rate, the incrementing rate, and/or the reference value can be selected to be smaller. It is thereby possible to coordinate the method according to the present invention with the modified environmental state variable and also, for example, to prevent overheating of the electrical unit at high ambient temperatures. Additionally or alternatively, provision can of course also be made to determine the first and/or the second reference value as a function of the at least one environmental state variable. As already discussed earlier, the environmental state variable can be the ambient temperature, but alternatively also the intake air temperature, oil temperature, or accessory temperature. In a further embodiment of the invention, the temperature equivalence value, the decrementing rate, the incrementing rate, and/or the reference value can be determined, additionally or alternatively to the environmental state variable, as a function of the driving state, in particular the vehicle speed.

A refinement of the invention provides that a starter device of a motor vehicle, in particular a starter generator, is used as an electrical unit. The electrical unit accordingly serves to start an internal combustion engine of the motor vehicle. It is particularly advantageous if the electrical unit is embodied as a starter generator, i.e. is usable as a generator after activation for starting the internal combustion engine.

The invention further relates to a temperature-limiting device, in particular for carrying out the method described above. The temperature-limiting device is, in this context, associated with an electrical unit activatable for a limited time period by way of an activation signal. Provision is made here that the temperature-limiting device permits activation of the electrical unit upon occurrence of the activation signal only when a counter value is greater than or less than a reference value, the temperature-limiting device incrementing or decrementing the counter value by a determined temperature equivalence value upon each activation of the electrical unit. The temperature-limiting device can be refined in accordance with the statements above.

The invention moreover relates to an electrical unit, in particular a starter device of a motor vehicle, having a temperature-limiting device, in particular in accordance with the statements above and/or for carrying out the method in accordance with the statements above, the electrical unit being activatable for a limited time period by way of an activation signal. Provision is made in this context that the temperature-limiting device permits activation of the electrical unit upon occurrence of the activation signal only if a counter value is greater than or less than a reference value, the temperature-limiting device incrementing or decrementing the counter value by a determined temperature equivalence value upon each activation of the electrical unit. The electrical unit can be refined in accordance with the statements above.

DETAILED DESCRIPTION OF THE INVENTION

Figure 1:
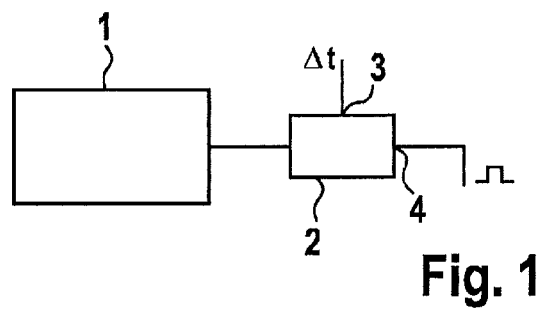
FIG. 1 schematically depicts an electrical unit having a temperature-limiting device.

FIG. 1 is a schematic view of an electrical unit 1 having a temperature-limiting device 2. Temperature-limiting device 2 is provided in order to prevent overheating of electrical unit 1 during the operation of unit 1. Temperature-limiting device 2 can have a time signal delivered to it via an input 3, and an activation signal via an input 4. Electrical unit 1 is, for example, a starter device of a motor vehicle, and consequently is activatable for a limited time period in order to bring the internal combustion engine of the motor vehicle to a specific rotation speed and thereby to start it. Activation of electrical unit 1 occurs by way of the activation signal. Temperature-limiting device 2, however, permits activation of the electrical unit 1, upon the occurrence or presence of the activation signal, only when a counter value is greater than a reference value. The counter value is incremented by a determined temperature equivalence value upon each activation of electrical unit 1. In addition, the counter value is to be decremented at a determined decrementing rate. This occurs continuously, but preferably only when electrical unit 1 is not activated. In this manner, the counter value at least approximately represents the actual temperature of electrical unit 1. For decrementing, the time signal is delivered to temperature-limiting device 2. Provision is made, for example, that the counter value is reduced by a predetermined value, determined by the decrementing rate, after a specific number of time signals has occurred.

Figure 2:
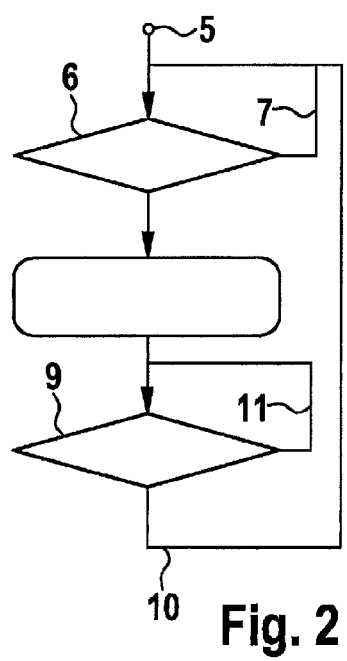
FIG. 2 schematically depicts a calculation procedure of a method for operating a temperature-limiting device for incrementing a counter value upon occurrence of an activation signal for an electrical unit.

FIG. 2 schematically depicts a calculation procedure of a method for operating temperature-limiting device 2. The calculation procedure relates to an incrementing of a counter value upon occurrence of the activation signal for electrical unit 1. The calculation procedure has a start 5, followed by a query 6. Query 6 ascertains whether an activation signal of an electrical unit 1 is present. If not, execution then branches in accordance with a path 7, and query 6 is carried out again.

If, on the other hand, the activation signal is present, an instruction 8 to increment the counter value is then executed. The counter value is incremented, in this context, by the determined temperature equivalence value.

The value range of the counter value is preferably taken into account in the context of incrementing, so that overrunning is prevented. Such overrunning might otherwise result in an erroneous counter value, and negatively affect the function of temperature-limiting device 2. In this context, firstly a check is made as to whether the counter value is greater than a maximum possible counter value minus the temperature equivalence value. If not, the counter value is then incremented by the temperature equivalence value. If, on the other hand, the counter value is greater than the maximum possible counter value minus the temperature equivalence value, the counter value is then set to the maximum possible counter value.

A query 9 is then carried out, ascertaining whether electrical unit 1 has already been activated for the limited time period. If so, or if activation of electrical unit 1 was not permitted, execution then proceeds along path 10 and query 6 is carried out again. If, on the other hand, electrical unit 1 is still activated, i.e. if the limited time period has not yet elapsed, execution then proceeds along a path 11, and query 9 is carried out again.

Figure 3:
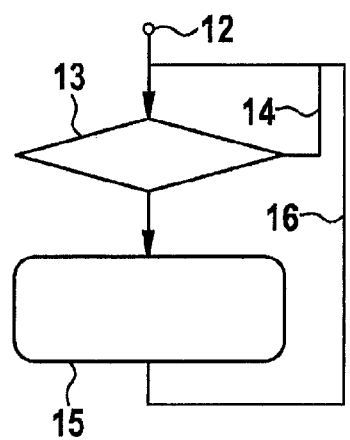
FIG. 3 schematically depicts a calculation procedure of the method for decrementing the counter value at a determined decrementing rate.

FIG. 3 schematically depicts a further calculation procedure of the method. The calculation procedure relates to the decrementing of the counter value at the determined decrementing rate. The calculation procedure begins with a start 12. Following start 12, a query 13 is carried out. This checks whether a time specified by the decrementing rate has already elapsed. If not, execution proceeds along a path 14, and query 13 is carried out again. If the time specified by the decrementing rate has passed, an instruction 15 is then executed, such that the counter value is decremented by a predetermined value, in particular 1.

It is preferable in this context to take into account the value range of the counter value in order to prevent the above-described overrunning. For this purpose, for example, a check is made as to whether the counter is greater than the predetermined value or greater than the minimum possible counter value plus the predetermined value. If so, the predetermined value is subtracted from the counter value. Otherwise the counter value is set to zero or to the minimum possible counter value. Then, in accordance with a path 16, query 13 is carried out again. The calculation procedure depicted in FIG. 3 is carried out continuously, in particular while electrical unit 1 is not activated, thereby representing the cooling of electrical unit 1.

Figure 4:
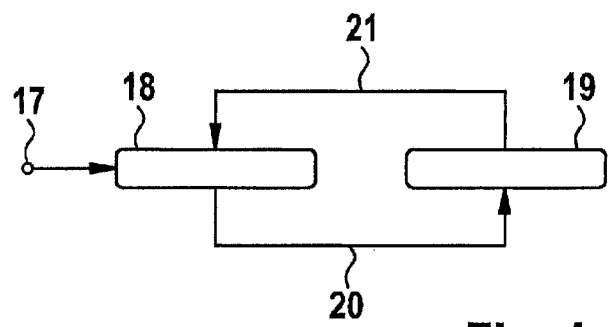
FIG. 4 schematically depicts an evaluation of the counter value in order to determine whether activation of the electrical unit is to be permitted.

FIG. 4 is a schematic depiction of an evaluation of the counter value. A start 17 is provided. The evaluation has two states, 18 and 19. In the first state 18, activation of electrical unit 1 is permitted, while in state 19 activation is not permitted. After start 17, firstly state 18 is active. If the counter value exceeds a maximum value, however, state 18 is deactivated and state 19 is activated. Activation of electrical unit 1 thereafter is thus not permitted, even upon occurrence of the activation signal. The changeover between states 18 and 19 is indicated by arrow 20. If state 19 is active, and if the counter value falls below a minimum value, state 18 is then activated and state 19 is deactivated. This is depicted by arrow 21. Activation of electrical unit 1 thereafter, upon occurrence of the activation signal, is thus permitted.

In other words, after start 17 the reference value is first set to a first reference value. If the counter value subsequently exceeds the maximum value, the reference value is then set to a second reference value which is less than the first reference value. Only when the counter value falls below a minimum value is the reference value again set to the first reference value. In this context, the first reference value advantageously corresponds to the maximum value, and the second reference value corresponds to the minimum value. A hysteresis-like behavior of temperature-limiting device 2 is thereby achieved.

What is claimed is:

1. A method for operating a temperature-limiting device of an electrical unit activatable for a limited time period by way of an activation signal, comprising:
    adjusting a counter value in the following manner: (i) the counter value is decremented at a predetermined rate of change; and (ii) the counter value is incremented by a determined temperature equivalence value only once upon each activation of the electrical unit;
    adjusting a reference value such that the reference value is set to a first reference value when the counter value falls below a minimum value, and the reference value is set to a second reference value when the counter value exceeds a maximum value, wherein the second reference value is less than the first reference value, the minimum value corresponds to the second reference value, and the maximum value corresponds to the first reference value; and
    permitting, by the temperature-limiting device, activation of the electrical unit upon occurrence of the activation signal only if the counter value is less than the reference value.

2. A method for operating a temperature-limiting device of an electrical unit activatable for a limited time period by way of an activation signal, comprising:
    adjusting a counter value in the following manner: (i) the counter value is decremented at a predetermined rate of change; and (ii) the counter value is incremented by a determined temperature equivalence value only once upon each activation of the electrical unit;
    adjusting a reference value such that the reference value is set to a first reference value when the counter value exceeds a maximum value, and the reference value is set to a second reference value when the counter value falls below a minimum value, wherein the second reference value is greater than the first reference value, the maximum value corresponds to the second reference value, and the minimum value corresponds to the first reference value; and
    permitting, by the temperature-limiting device, activation of the electrical unit upon occurrence of the activation signal only if the counter value is greater than the reference value.

3. The method as recited in claim 1, wherein at least one of (i) the temperature equivalence value of a temperature elevation of the electrical unit generated by activation of the electrical unit, and (ii) the predetermined rate of change of decrementing the counter value, substantially corresponds to a cooling rate of the electrical unit.

4. The method as recited in claim 3, wherein at least one of the temperature equivalence value, the rate of change, and the reference value is determined as a function of at least one of a measured environmental state variable and a measured vehicle state.

5. The method as recited in claim 4, wherein the electrical unit is a starter generator of a motor vehicle.

6. The method as recited in claim 2, wherein at least one of (i) the temperature equivalence value of a temperature elevation of the electrical unit generated by activation of the electrical unit, and (ii) the predetermined rate of change of decrementing the counter value, substantially corresponds to a cooling rate of the electrical unit.

7. The method as recited in claim 6, wherein at least one of the temperature equivalence value, the rate of change, and the reference value is determined as a function of at least one of a measured environmental state variable and a measured vehicle state.

8. The method as recited in claim 7, wherein the electrical unit is a starter generator of a motor vehicle.

9. A temperature-limiting device of an electrical unit activatable for a limited time period by way of an activation signal, comprising:
    means for adjusting a counter value in the following manner: (i) the counter value is decremented at a predetermined rate of change; and (ii) the counter value is incremented by a determined temperature equivalence value only once upon each activation of the electrical unit;
    means for adjusting a reference value such that the reference value is set to a first reference value when the counter value falls below a minimum value, and the reference value is set to a second reference value when the counter value exceeds a maximum value, wherein the second reference value is less than the first reference value, the minimum value corresponds to the second reference value, and the maximum value corresponds to the first reference value; and
    means for permitting activation of the electrical unit upon occurrence of the activation signal only if the counter value is less than the reference value.

10. A temperature-limiting device for an electrical unit activatable for a limited time period by way of an activation signal, comprising:
    means for adjusting a counter value in the following manner: (i) the counter value is decremented at a predetermined rate of change; and (ii) the counter value is incremented by a determined temperature equivalence value only once upon each activation of the electrical unit;
    means for adjusting a reference value such that the reference value is set to a first reference value when the counter value exceeds a maximum value, and the reference value is set to a second reference value when the counter value falls below a minimum value, wherein the second reference value is greater than the first reference value, the maximum value corresponds to the second reference value, and the minimum value corresponds to the first reference value; and
    means for permitting activation of the electrical unit upon occurrence of the activation signal only if the counter value is greater than the reference value.

* * * * *